US006971306B2

(12) United States Patent
Areh et al.

(10) Patent No.: US 6,971,306 B2
(45) Date of Patent: Dec. 6, 2005

(54) JUICER

(75) Inventors: Marko Areh, Radlje Ob Dravi (SI); Peter Brezovnik, Mozirje (SI); Siegmund Kramer, Kirchanschöring (DE); Stanislav Mazej, Gomilsko (SI); Henrik Pavlovic, Ljubno Ob Savinji (SI); Michael Steffl, Marquartstein (DE); Igor Zibret, Smartno Ob Paki (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/791,593

(22) Filed: Mar. 1, 2004

(65) Prior Publication Data

US 2005/0011373 A1 Jan. 20, 2005

Related U.S. Application Data

(63) Continuation of application No. PCT/EP02/09463, filed on Aug. 23, 2002.

(30) Foreign Application Priority Data

Aug. 30, 2001 (DE) ................................ 101 42 506

(51) Int. Cl.⁷ ............................................. A47J 19/02
(52) U.S. Cl. ........................ 99/501; 99/503; 99/504; 99/505; 99/506; 99/508
(58) Field of Search ................. 99/485, 486, 489, 99/492, 495, 501–508, 509–513, 348; 241/101.01, 241/37.5, 92, 101.2, DIG. 17; 100/213, 98 R, 100/208

(56) References Cited

U.S. PATENT DOCUMENTS

| 1,533,208 | A | | 4/1925 | Pursell | |
|---|---|---|---|---|---|
| 1,955,975 | A | * | 4/1934 | Puterbaugh | 99/503 |
| 2,032,477 | A | | 3/1936 | Griffin | |
| 3,566,939 | A | * | 3/1971 | Hubrich | 99/501 |
| 4,240,338 | A | * | 12/1980 | McClean | 99/501 |
| 4,378,730 | A | * | 4/1983 | Coggiola | 99/501 |
| 4,706,559 | A | * | 11/1987 | De Zarate | 99/504 |
| 4,744,522 | A | * | 5/1988 | Borgmann et al. | 241/92 |
| 5,088,392 | A | * | 2/1992 | Ancona et al. | 99/499 |
| 5,193,447 | A | * | 3/1993 | Lucas et al. | 99/508 |
| 6,135,018 | A | * | 10/2000 | Yu et al. | 99/504 |
| 6,536,335 | B1 | * | 3/2003 | Ashworth | 99/501 |
| 6,539,848 | B2 | * | 4/2003 | Wang et al. | 99/508 |
| 6,598,518 | B2 | * | 7/2003 | Wong | 99/942 |
| 6,668,709 | B1 | * | 12/2003 | Codina Vilana et al. | 99/503 |

FOREIGN PATENT DOCUMENTS

EP 0 362 058 A1 4/1990

* cited by examiner

Primary Examiner—Timothy F. Simone
(74) Attorney, Agent, or Firm—John T. Winburn; Russell W. Warnock; Craig J. Loest

(57) ABSTRACT

A juicer has a tilting collecting dish that permits simple, loss-free pouring out of the fruit juice. It is unnecessary to remove the squeeze element with which the citrus fruit was pressed and/or the collecting container surrounding the squeeze element, from which the fruit juice drops into the collecting dish. In order to tilt the collecting dish, two opposing projections are provided on the outer side of the jacket wall thereof, which lie rotatably of pivotally in recesses on the inside of the housing wall.

20 Claims, 2 Drawing Sheets

JUICER

CROSS-REFERENCE TO RELATED APPLICATION

This application is a continuation, under 35 U.S.C. § 120, of copending international application No. PCT/EP02/09463, filed Aug. 23, 2002, which designated the United States; this application also claims the priority, under 35 U.S.C. § 119, of German patent application No. 101 42 506.6, filed Aug. 30, 2001; the prior applications are herewith incorporated by reference in their entirety.

BACKGROUND OF THE INVENTION

Field of the Invention

The invention relates to a juicer with a collecting container with a projecting element for pressing a half of a fruit containing juice and with a collecting dish for catching fruit juice running out of outlet apertures in the collection container.

Such juicers for the pressing of citrus fruits are generally known. An element projecting from a collecting container, which is substantially designed as a rotation paraboloid serves to catch fruit pulp and fruit juice squeezed out of the fruit. While the fruit juice runs out of outlet apertures in the base area of the collecting container into the collecting dish, the fruit pulp remains suspended in the collecting container.

On the other hand, a juicer driven by an electric motor is known from European patent EP 0 362 058 B1. The collecting container and the collecting dish are accommodated in a housing. A drive shaft projects through the middle of the collecting dish which sets the projecting element in rotational motion and with it the collecting container.

SUMMARY OF THE INVENTION

It is an object of the invention to provide a fruit juicer which overcomes the disadvantages of the heretofore-known devices and methods of this general type and the operation of which is simplified.

With the foregoing and other objects in view there is provided, in accordance with the invention, a juicer, comprising:
a housing;
a collecting container with a projecting element for pressing fruit containing fruit juice disposed in said housing; and
a collecting dish pivotally mounted in said housing for collecting the fruit juice running out of said collecting container.

In other words, the objects are achieved with a juicer of the type referred to above in that the collecting dish is mounted in a tiltable manner in a housing. By mounting the collecting dish at two points, essentially two positions are obtained which this adopts. In a first position, the collecting dish is inclined back from a pouring aperture which it possesses, as a result of which the running out of the fruit juice is prevented. In a second position, the collecting dish is inclined towards an outlet aperture, so that all the fruit juice which has collected in the collecting dish runs out of it.

If the collecting dish is tilted out of its position of equilibrium, when a level is exceeded which is dependent on the tilt angle, fruit juice flows out of the collecting dish and can be caught in a drinking container or a jug. In this way, there is no need to lift the collecting container from the collecting dish. When the collecting dish is tilted, the fruit juice can be drawn off without dripping or loss, while with the known principle of lifting off the collecting container there is the risk that drips will fall from this fruit juice and cause dirt contamination, which in most cases are, in addition, sticky. As well as this, a correspondingly usable part of the fruit juice for drinking is lost. Thanks to the tilt solution, the invention provides assistance in this situation. The collecting container only needs to be taken out of the housing for the first time when the outlet apertures are blocked with fruit pulp and the fruit juice is backing up in the collecting container.

In accordance with an added feature of the invention, the juicer has on the outside of its jacket wall two opposing projections, which on their underside have an at least essentially circular rounding, located in each case in a circular mounting in the housing.

Particularly suitable is a juicer in which the mounts are formed as indentations of an upper edge or are formed in the vicinity of the upper edge of a jacket wall of the housing.

For preference the juicer has a pouring aperture, which is arranged offset by 90° to the projections, and which project through the jacket wall of the housing. The fruit juice cam be removed from the juicer in a simple manner through the aperture.

If the juicer is driven by a motorized drive, i.e. the element rotates and with it the collecting container, then a central opening is provided in the base wall of the collecting container, through which a shaft journal of a drive shaft projects for driving the element.

In a further advantageous variant a handle, in the form of a grip, is arranged above the outlet aperture of the collecting dish. When the handle is pushed down or pulled upwards the collecting dish is tilted.

For preference the juicer is formed with a lip which allows for the fruit juice to be poured out easily.

In a suitable variant of the juicer the collecting dish has a tilt angle which is delimited by a collar set on the housing and pointing inwards.

In order to avoid the fruit juice overflowing from the collecting dish over the central hole in its wall surrounding the base wall, this projects higher up than the highest level of fruit juice which can be reached in it.

For preference the juicer is designed in such a way that the housing exhibits a base wall beneath the collecting dish, which delimits the tilt angle of the collecting dish downwards.

An embodiment of the juicer which is suitable for this consists of the base wall being inclined downwards to both sides from a line running through its mid-point and parallel to the tilt axis.

In order to be able to position the juicer securely, engagement means are provided in the housing, through which at least one first position is secured in which the collecting dish can be filled with fruit juice, and a second position can be secured in which the collecting dish can be emptied through the outlet aperture. Further positions can also be determined if the collecting dish can be engaged in corresponding engagement positions in the housing.

Other features which are considered as characteristic for the invention are set forth in the appended claims.

Although the invention is illustrated and described herein as embodied in a juicer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
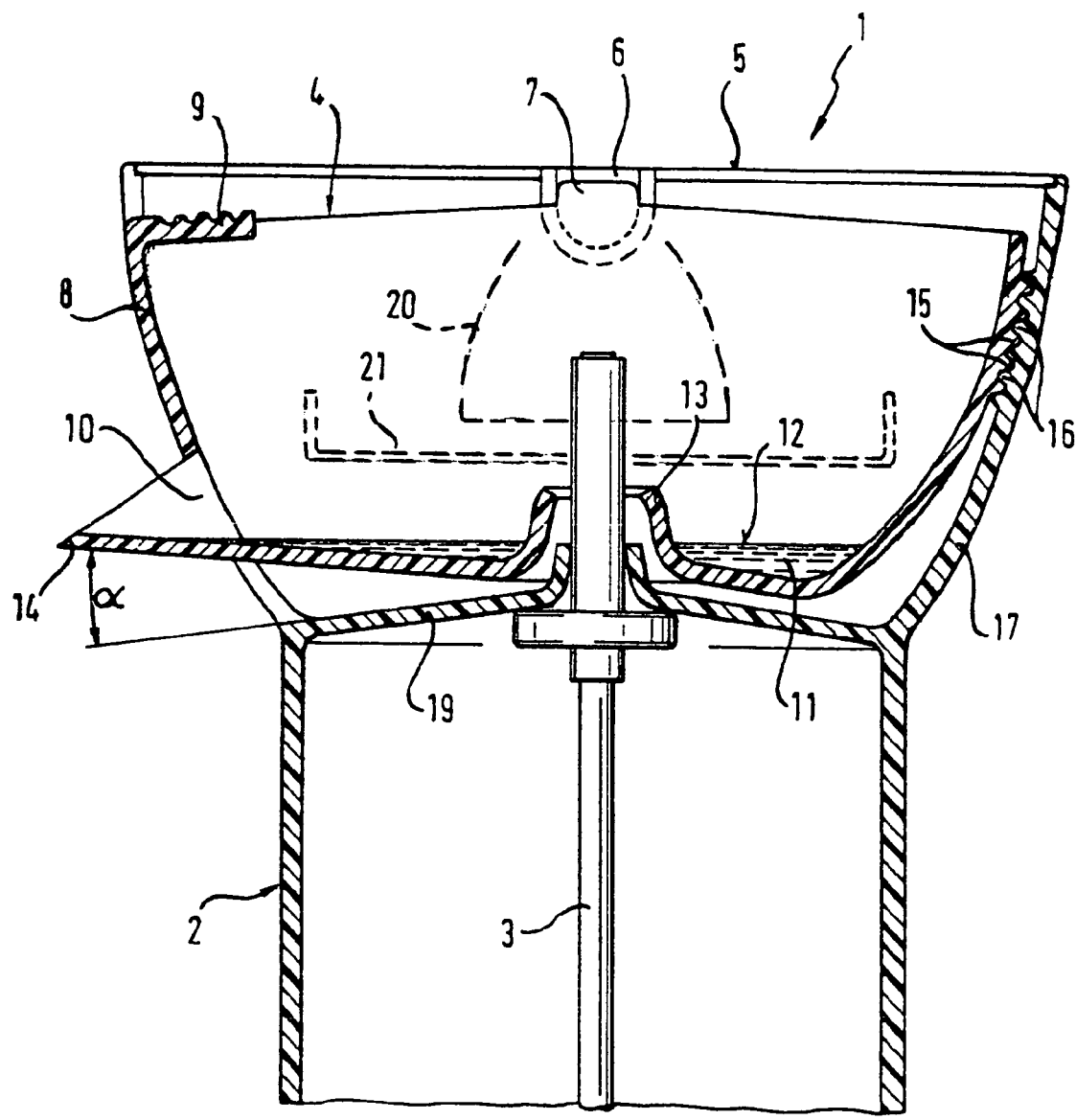
FIG. 1 is a longitudinal section of a collecting dish located in a housing for a juicer.
Figure 2:
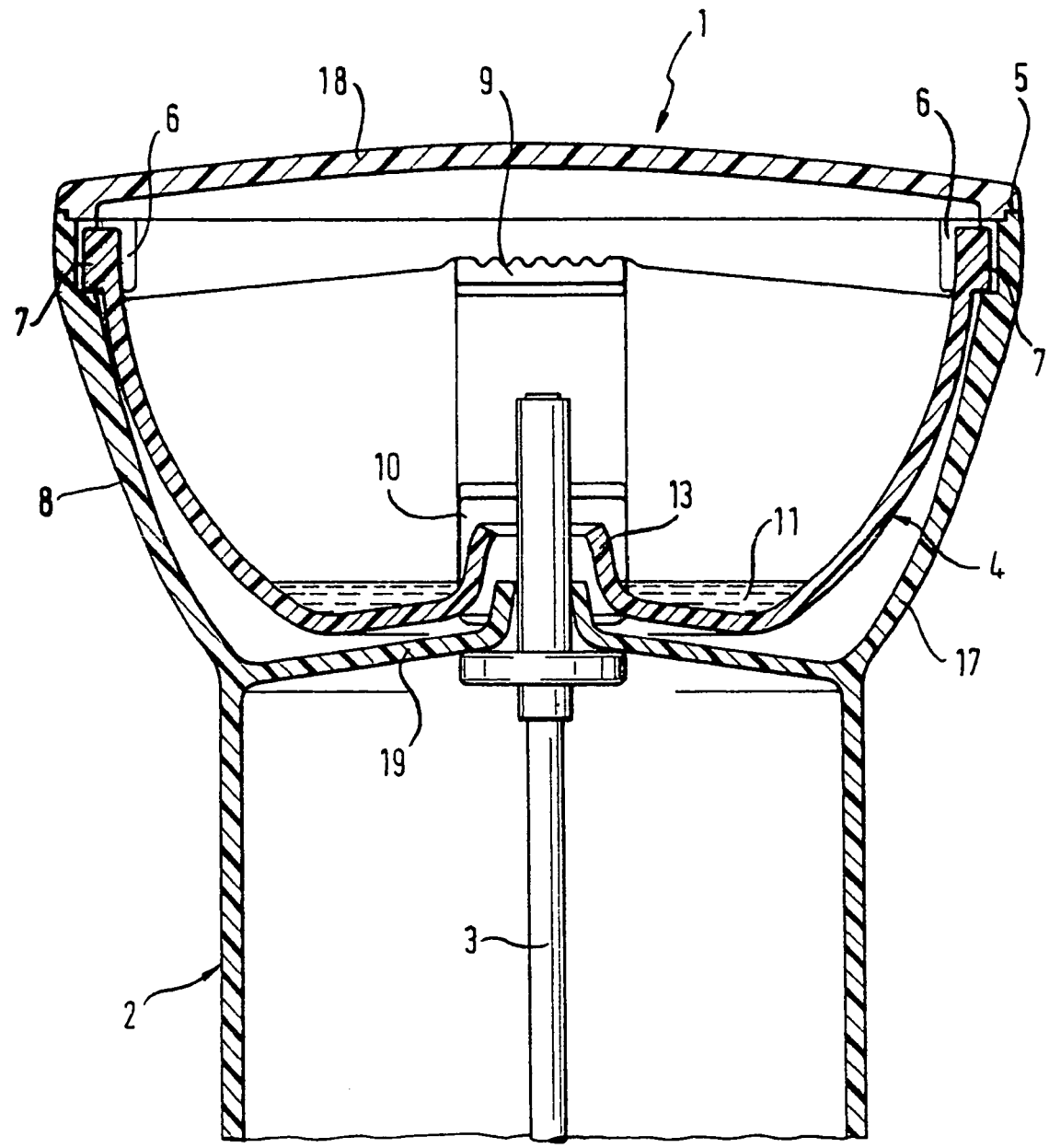
FIG. 2 is a sectional view of a section taken substantially perpendicularly to the section of FIG. 2, of the collecting dish according to the invention.

Referring now to the figures of the drawing in detail and first, particularly, to FIG. 1 thereof, there is shown a juicer 1 with a housing 2 formed substantially as a hollow cylinder. A motorized drive assembly is disposed in the housing—but the drive is not illustrated in detail for purposes of clarity. The motor drives a projecting element 20, centrally arranged, which substantially has the shape of a cone or rotation paraboloid with ridges formed on its outer wall for pressing out citrus fruit and which is securely connected to a collecting container 21, known for example from the above-mentioned European patent EP 0 362 058 B1 in connection with the element. The disclosure of the European patent is herewith incorporated in its entirety. The element 20 and the collecting container 21, which are only diagrammatically illustrated, are commonly driven via a drive shaft 3 by the electric motor. The fruit juice which is produced in this way drips from outlet apertures of the collecting container into a collecting dish 4, which is arranged substantially beneath the collecting container and, preferably, surrounding it laterally.

The housing 2 has in the region of its upper edge 5 two opposing recesses 6, which in each case accommodate a projection 7, which is secured on the outside of a jacket wall 8 of the collecting dish 4. The projections 7 have a substantially arc-shaped contour on their underside, with which they lie on the recesses 6. By means of the projections 7 the collecting dish 4 can be pivoted about an angle α. As shown, the center of gravity of the collecting dish (4) lies below the pivot axis defined by the projections 6 and the recess 7. A handle 9 is used to carry out the tilting or pivoting movement. The handle is disposed at the upper edge of the jacket wall 8 above an opening 10 of the collecting dish 4. When a user pushes the handle 9, the handle 9 is pressed downwards, so that fruit juice 11, which stands in the collecting dish 4 up to a level 12, runs out of the opening 10. In the position represented in FIG. 1 the collecting dish 4 is in the position in which it can be filled with the fruit juice 11. In this situation the collecting dish 4 has a wall 13, which delimits an opening surrounding the drive shaft, of which the upper edge projects sufficiently high to prevent, in any tilt position of the collecting dish 4, the fruit juice 11 from running down over the upper edge of the wall 13.

In the area of the opening 10 the collecting dish 4 has a lip 14, which facilitates the pouring of the fruit juice 11.

On the side opposite the opening 10 the collecting dish 4 is formed with ratchet notches 15 on the outside of its jacket wall 8. The notches 15 mesh, or interact, with counter-notches 16 on the inside of a jacket wall 17 of the housing 2 in such a way that the collecting dish 4 remains in each case in the engagement position into which it was tilted due to the actuation of the handle 9.

A collar 18 is disposed on the housing wall 17, above the collecting container and the collecting dish 4. The collar 18 prevents the collecting dish 4 from tilting upwards beyond a specified angle. The degree of tilt downwards of the collecting dish 4 is limited by a base wall 19 in the housing 2. The base wall 19 in this situation is inclined slightly downwards to both sides from a line running through its center point parallel to the tilt axis of the collecting dish 4, i.e. towards the opening 10 and to the side turned away from the opening 10, in order to guarantee that the collecting dish 4 can be tilted.

By means of the invention a juicer 1 is provided with a tiltable or pivotable collecting dish 4, which allows for a simple and loss-free pouring of the fruit juice 11, without the element through which the citrus fruit is pressed out, and the collecting container surrounding this, from which the fruit juice drips down into the collecting dish 4, having to be removed from the housing 2. In order to tilt the collecting dish 4, two opposing projections 7 are provided on the outside of its jacket wall 8, which lie in recesses 6 on the inside of the housing wall 17 in a rotatable manner.

We claim:

1. A juicer, comprising:
   a housing;
   a collecting container with a projecting element for pressing fruit containing fruit juice disposed in said housing; and
   a collecting dish disposed in said housing for collecting the fruit juice running out of said collecting container;
   said collecting dish being pivotally mounted in said housing.

2. The juicer according to claim 1, wherein said collecting dish has a jacket wall and two mutually opposing projections on an outside of said jacket wall, said projections having substantially rounded undersides, and said housing has recesses formed therein for supporting said projections.

3. The juicer according to claim 2, wherein said projections are formed with substantially circular arc-shaped undersides and said recesses in said housing are formed with substantially circular arc-shaped support surfaces for supporting said projections therein.

4. The juicer according to claim 2, wherein said housing is formed with a jacket wall having an upper edge, and said recesses are formed as indentations in said upper edge of said jacket wall of said housing.

5. The juicer according to claim 2, wherein said housing is formed with a jacket wall having an upper edge, and said recesses are formed in a vicinity of said upper edge of said jacket wall of said housing.

6. The juicer according to claim 2, wherein said housing has a jacket wall formed with an outlet aperture substantially offset by 90 degrees from said mutually opposing projections.

7. The juicer according to claim 1, which comprises a drive shaft for driving said element projecting through a central opening in a base wall underneath said element.

8. The juicer according to claim 1, wherein said collecting dish is formed with a handle for manually tilting said dish.

9. The juicer according to claim 2, wherein said housing has a jacket wall formed with an outlet aperture substantially offset by 90 degrees from said mutually opposing projections, and said collecting dish is formed with a handle disposed above said outlet aperture for manually tilting said collecting dish.

10. The juicer according to claim 6, wherein said outlet aperture has a lip.

11. The juicer according to claim 10, which comprises an inwardly projecting collar formed on said housing for delimiting a tilt angle of said collecting dish in an upward direction.

12. The juicer according to claim 7, wherein a wall of said collecting dish surrounding said central opening projects higher than a highest level projected for the fruit juice collecting in said collecting dish.

13. The juicer according to claim 10, wherein a wall of said collecting dish surrounding said central opening projects to a geodetically higher level than said lip.

14. The juicer according to claim 1, wherein said housing has a base wall underneath said collecting dish, and said base wall is configured to downwardly limit a tilt angle of said collecting dish.

15. The juicer according to claim 14, wherein said base wall is inclined downwardly to both sides starting from a line running through a center point thereof and parallel to a tilt axis of said collecting dish.

16. The juicer according to claim 1, wherein said collecting dish is formed with a ratchet device configured to interacts with a ratchet device of said housing, said ratchet devices being configured to secure at least one first position, in which said collecting dish can be filled with fruit juice, and a second position in which fruit juice can be poured from said collecting dish.

17. A juicer, comprising:
a housing;
a projecting element disposed within the housing for pressing fruit containing fruit juice, the projecting element being rotatable with respect to the housing about a rotational axis; and
a collecting dish collecting fruit juice and being tiltably mounted to the housing for tilting movement with respect to the housing about a tilt axis, the tilt axis of the collecting dish being substantially transverse to the rotational axis of the projecting element.

18. The juicer according to claim 17, wherein the housing defines two opposing recesses and the collecting dish includes two opposing projections extending outwardly from the collecting dish, the projections engaging the respective recesses to support the collecting dish for tilting movement with respect to the housing, the tilting axis of the collecting dish extending through the projections.

19. A juicer, comprising:
a housing;
a projecting element disposed within the housing for pressing fruit containing fruit juice; and
a collecting dish having a bottom surface and an outlet aperture, the collecting dish being tilatably mounted to the housing for tilting movement with respect to the housing between a first condition, in which the bottom surface slopes downwardly away from the outlet aperture for retaining fruit juice in the collecting dish, and a second condition, in which the bottom surface slopes downwardly toward the outlet aperture for discharging fruit juice from the collecting dish.

20. The juicer according to claim 19, wherein the housing defines two opposing recesses and the collecting dish includes two opposing projections extending outwardly from the collecting dish, the projections engaging the recesses to support the collecting dish for tilting movement with respect to the housing, the outlet aperture being offset by about 90 degrees from each of the two opposing projections.

* * * * *